J. L. FIRM.

Device for Protecting the Ends of Rolls of Paper, &c

No. 6,533. Reissued July 6, 1875.

Witnesses
John Becker.
Fred Haynes

J. L. Firm
by his Attorneys
Brown & Allen

UNITED STATES PATENT OFFICE.

JOSEPH L. FIRM, OF NEW YORK, N. Y.

IMPROVEMENT IN DEVICES FOR PROTECTING THE ENDS OF ROLLS OF PAPER, &c.

Specification forming part of Letters Patent No. 160,175 dated February 23, 1875; reissue No. 6,533, dated July 6, 1875; application filed June 5, 1875.

*To all whom it may concern:*

Be it known that I, JOSEPH L. FIRM, of New York, in the county and State of New York, have invented a new and useful Device for Protecting the Ends of Rolls of Paper, Cloth, and other Fabrics; and I do hereby declare that the following is a full, clear, and exact description of the same, reference being had to the accompanying drawing making part of this specification:

My invention relates to certain devices, which may be applied to rolls of fabrics of various kinds, so that said rolls may be handled, transported, or set on end without injury to the edges of the fabric.

The principal object of the invention, however, is to provide means for protecting the ends of rolls of paper, such as are used in some printing-presses for printing from a continuous sheet or web. Such rolls, when made up at the factory, are wound around tubes; and with a view to prevent the paper from being soiled or injured, the rolls are wrapped with coarse paper covering the ends and sides. It is found in practice that the coarse paper does not afford sufficient protection when the rolls are handled carelessly or placed on end, as the edges of the continuous sheet sometimes become soiled, broken, or torn, and the marginal portion of the entire roll is rendered useless.

My invention consists in two caps, adapted to be placed at the ends of the roll, and a connecting rod or bolt passed through the same and secured at the ends, whereby the ends of the roll are entirely covered and protected from injury.

Figure 1:
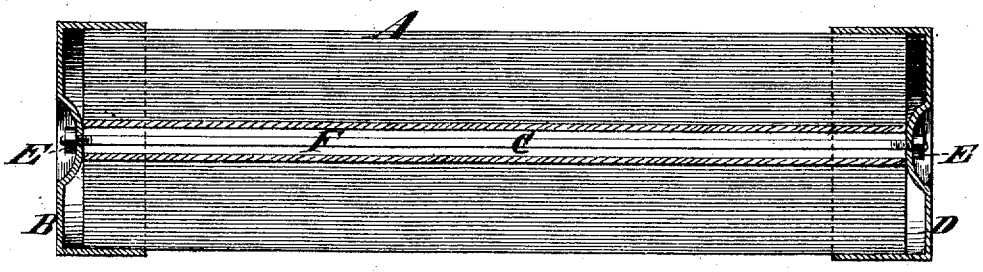
Figure 2:
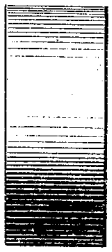
Figure 3:
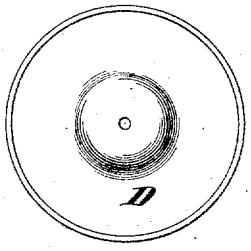

In the accompanying drawing, Figure 1 is a longitudinal sectional view of a roll, with my invention applied thereto. Fig. 2 is a side view, and Fig. 3 a face view, of one of the caps or disks.

A represents a roll of paper wound around a tube, F, as before described. This tube is usually made of wood, and forms a part of the roll as made up at the factory, and it serves a double purpose: first, it constitutes a core or stock, upon which the paper is wound very compactly; and, secondly, it serves for the reception of a shaft belonging to the printing-press, which shaft is passed through the tube before placing the roll in the press to be printed, and its ends are provided with bearings in the press, allowing the roll to revolve as the paper is fed to the printing mechanism.

In order to protect such rolls from injury when being handled or transported, or when placed on end, I employ two caps, B D, placed at the ends of a roll and connected by a rod passing through the center thereof. The edges of the caps are represented as being turned so as to form a circular rim to fit the ends of the rolls. The rod for connecting these caps may have a screw-thread at each end, or a head at one end and a screw-thread at the other, for engagement with a nut. The caps are connected and secured in place by means of a rod, C, which passes through the tube F, and is fastened by nuts E E at the ends. These caps are represented as countersunk or recessed in the center, for the reception of the nuts, so that they will not project beyond the surface, but be out of the way when the roll is placed on end. The caps may be secured on the roll before it leaves the factory; and when the roll is to be placed in the press to be printed, they and the rod C are removed and a shaft is passed through the tube, as before described, and placed in its bearings in the press. When the paper is all unwound from the tube, said tube and the caps and rod are laid aside to be returned to the factory.

Although this invention is particularly applicable to rolls of paper used for printing purposes, and may be used either with or without the ordinary coarse paper-wrapper, yet it is readily applicable to rolls of carpet, cloth, or other fabrics, by applying the caps to the ends, and passing the rod through the center of the roll.

What I claim as new, and desire to secure by Letters Patent, is—

A roll-protector, composed of two caps and a connecting rod combined, substantially as and for the object specified.

JOSEPH L. FIRM.

Witnesses:
BENJAMIN W. HOFFMAN,
FRED. HAYNES.